United States Patent [19]

Ohyama et al.

[11] 4,448,070
[45] May 15, 1984

[54] HOT-WIRE TYPE FLOW VELOCITY METER

[75] Inventors: Yoshishige Ohyama; Yutaka Nishimura; Teruo Yamauchi, all of Katsuta; Hiroshi Kuroiwa; Minoru Ohsuga, both of Hitachi; Tadashi Kirisawa, Katsuta, all of Japan

[73] Assignee: Hitachi, Ltd., Tokyo, Japan

[21] Appl. No.: 368,641

[22] Filed: Apr. 15, 1982

[30] Foreign Application Priority Data

Apr. 20, 1981 [JP] Japan .................................. 56-58473

[51] Int. Cl.³ .............................................. G01F 1/68
[52] U.S. Cl. .................................................... 73/204
[58] Field of Search ..................... 73/27 R, 204, 118 A

[56] References Cited

U.S. PATENT DOCUMENTS

| 3,246,515 | 4/1966 | Martino et al. | 73/204 |
| 3,363,462 | 1/1968 | Sabin | 73/204 |
| 3,777,366 | 12/1973 | Kiefer | 73/27 |
| 3,900,819 | 8/1975 | Djorup | 73/204 |
| 4,074,566 | 2/1978 | Obayashi et al. | 73/204 |
| 4,283,944 | 8/1981 | Gruner | 73/204 |

Primary Examiner—Herbert Goldstein
Attorney, Agent, or Firm—Antonelli, Terry & Wands

[57] ABSTRACT

A hot-wire type flow velocity meter having a heat generating electric resistor and a supporting member for supporting the electric resistor. Shielding means are provided to shield the supporting member to prevent the change of heat transfer from the supporting portion to the fluid around the supporting portion due to a change in the flow velocity, thereby to eliminate the error in the flow velocity measurement.

9 Claims, 23 Drawing Figures

FIG. 10
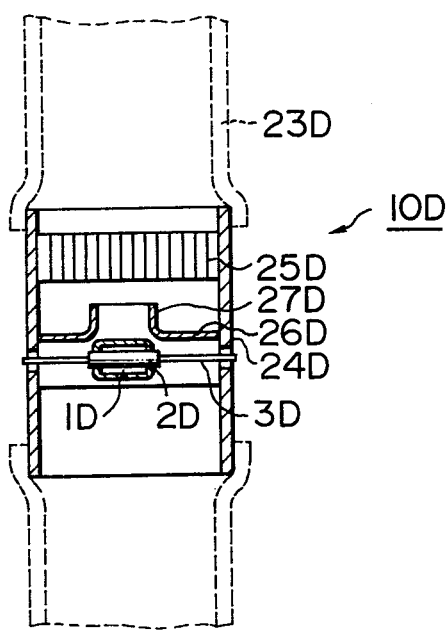
FIG. 11
FIG. 12
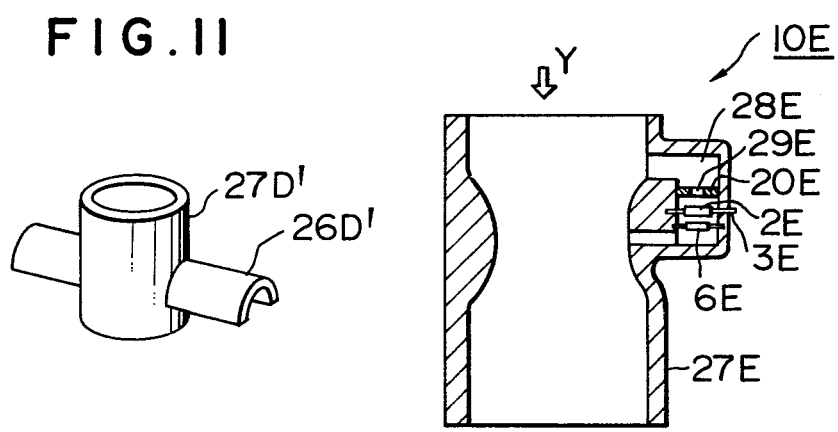

CENTER OF ELECTRIC HEATING RESISTOR     END OF ELECTRIC HEATING RESISTOR

TEMPERATURE w

HOT-WIRE TYPE FLOW VELOCITY METER

BACKGROUND OF THE INVENTION

The present invention relates to a hot-wire type flow velocity meter and, more particularly, to a hot-wire type flow velocity meter suitable for use in the measurement of fluctuating flow velocity.

The hot-wire type flow velocity meter is a device which is adapted to measure the flow velocity of a fluid by sensing the change of rate of heat transfer from an electric resistor to the fluid. In general, the electric resistor is supported by a suitable supporting member, so that the end of the support member adjacent to the electric resistor is maintained at a high temperature while the other end is maintained at the same temperature as the ambient fluid. In consequence, the heat generated by the electric resistor is consumed by being transferred to the fluid directly from the electric resistor, to the fluid through the supporting member and to other members through the supporting member. As is well known, the heat transfer other than the direct heat transfer to the fluid causes an error in the measurement of the flow velocity. In order to obviate the influence of the heat transfer other than the direct one, it is necessary to diminish as much as possible the heat transfer cross-sectional area of the supporting member or to enlarge as much as possible the heat radiating area of the electric resistor. These measures, however, are quite impractical from the view point of mechanical strength.

SUMMARY OF THE INVENTION

Accordingly, an object of the invention is to provide a hot-wire type flow velocity meter in which the rate of heat transfer other than the direct heat transfer from the electric resistor to the fluid is made constant and minimized to eliminate the error of the measurement.

To this end, according to the invention, there is provided a hot-wire type flow velocity meter characterized by comprising a shielding means adapted to shield the supporting member for supporting the electric resistor, thereby to avoid the change of flow velocity of the fluid around the supporting member.

The above and other objects, features and advantages of the invention will become clear from the following description of the preferred embodiment of the invention taken in conjunction with the accompanying drawings.

BRIEF DESCRIPTION OF THE DRAWINGS

FIGS. 6 to 16 are illustrations of second to ninth embodiments of the invention, respectively;

DESCRIPTION OF THE PREFERRED EMBODIMENTS

Figure 1:
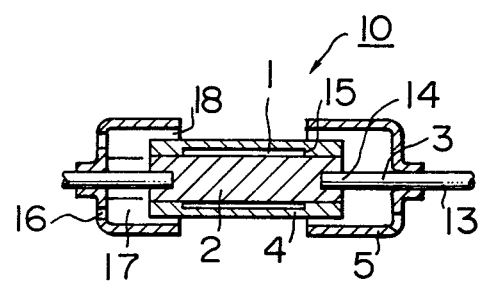
FIG. 1 is a longitudinal sectional view of a portion of a hot-wire type flow velocity meter in accordance with a first embodiment of the invention.

Referring first to FIG. 1, there is shown a velocity sensing portion of a hot-wire type flow velocity meter 10 in accordance with the invention. This flow velocity meter 10 includes an electric resistor 1 consisting of a platinum film or wire of platinum, nickel, copper or the like, a support 2 mounting the electric resistor, electrically insulating coating material 4 such as of glass, ceramic or the like formed on the electric resistor 1, supporting members 3 carrying the support 2 and made of a metallic material such as stainless steel, copper or the like or a ceramic, and a cover 5 supported by the supporting members 3. The support 2 has a form of a ceramic member, electrically insulated metallic pipe, insulating bar and so forth.

The ends of the supporting members 3 are fixed to different members. Shielding members 5 fixed to the supporting members 3 cover respective ends of the support 2 and the portions of the supporting members adjacent to the ends of the support 2. The shielding members 5 are fixed to the supporting members 3 and, hence, are in contact with the latter, but other portions of the shielding members 5 contact neither the support 2 nor other parts of the supporting members 3.

In the flow velocity meter 10 shown in FIG. 1, if the support 2 has a cylindrical form, the shielding members 5 are attached to the ends of the supporting members 3 as shown in FIG. 1. When the gap 18 between the shielding member 5 and the support 2 is diminished, the temperature of the fluid in the shielding members 5 is raised to cause a change in the rate of heat transfer by convection thereby to vary the temperature distribution. In order to eliminate this inconvenience, each shielding member 5 can have ventilation holes 16 to equalize the temperatures of the fluid at the inside and outside of the shielding member 5. Alternatively, a cylindrical guide plate 17 concentric with the supporting member 3 is fixed to the shielding member 5 so that the flow velocity of the fluid contacting the outer surface of the supporting member 3 stands still even when the flow velocity of the fluid at the outside of the shielding member 5 is changed. It will be seen that the change of temperature distribution along the length of the supporting member 2 is substantially nullified.

Figure 2:
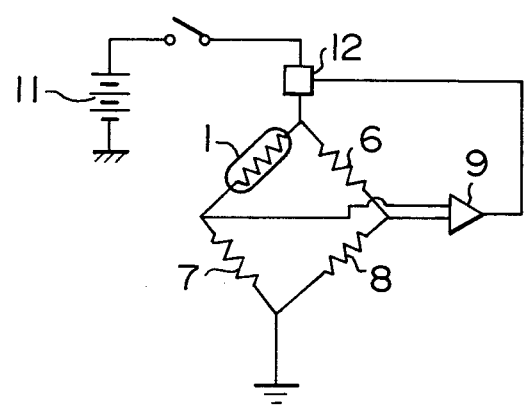
FIG. 2 is an electric circuit diagram of a hot-wire type flow velocity meter incorporating an electric resistor shown in FIG. 1.

The electric resistor 1 thus formed is incorporated in an electric circuit as shown in FIG. 2. More specifically, a bridge circuit is constituted by an electric resistor 1, bridge resistors 7 and 8, and a temperature compensation resistor 6 which will be detailed later. The voltage differential picked up from the juncture between the electric resistor 1 and the bridge resistor 7 and the juncture between the temperature compensation resistor 6 and the bridge resistor 8 is used for controlling a current controller 12 through an amplifier 9. The current controller 12 is adapted to control the electric current from a power supply 11 connected to the junctures between the electric resistor 1 and the temperature compensation resistor 6 and between the bridge resistors 7 and 8.

Figure 3:
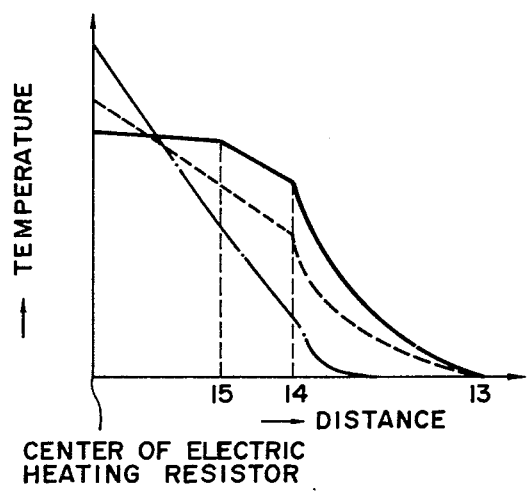
FIG. 3 illustrates temperature distributions in the electric resistor and the supporting member as observed when there is a shielding member and when there is no shielding member.
Figure 4:
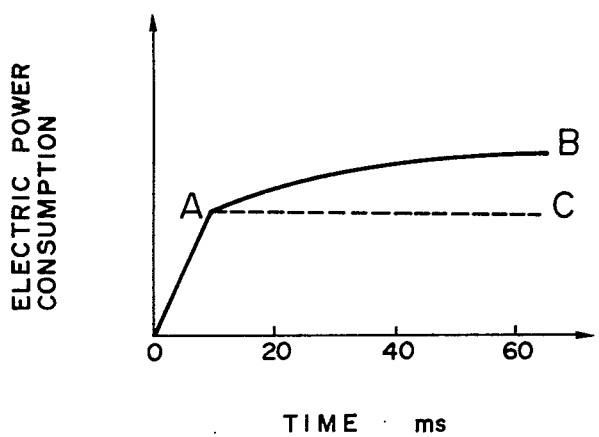
FIG. 4 is an illustration of the transient power consumption by the electric resistor as observed when there is a shielding member and when there is no shielding member.

The hot-wire type flow velocity meter 10 shown in FIG. 1 operates in a manner explained hereinunder. As the electric power is supplied to the bridge, the electric current through the current controller 12 is increased until the bridge is balanced, so that the electric resistor 1 is heated until the temperature thereof is raised to a set temperature. The heat generated by the electric resistor 1 is consumed by being transferred by convention to the fluid from the surfaces of the supporting member 3 and the support 2 and heat transfer through the supporting member 3 to other members. In consequence, a lengthwise temperature distribution as shown by full line in FIG. 3 is formed over the area from the center of the electric resistor 1 and the end 13 of the supporting member 3. This temperature distribution is not changed even if the flow velocity of the fluid on the surface of the support 2 is increased, because the flow velocity on the portion convered by the shielding members 5 stands still. In contrast, in the case where there is no shielding member, a temperature distribution as shown by broken line in FIG. 3 is formed because the ends of the support 2 and the supporting members 3 are cooled by the fluid. Thus, the temperature distribution as shown by one-dot-and-dash line in FIG. 3 is formed as the flow velocity of the fluid is increased if there is no provision of the shielding member 5. This change of the temperature distribution is observed over a period of time length which is determined by the rate of change of the flow velocity and heat conductivities of the materials. For instance, a settling time of 20 to 500 ms is required even when the support 2 has a small diameter and a small length of 0.5 mm and 2 mm, respectively. When there is a stepped change of the flow velocity, the electric power consumption by the electric resistor 1 is changed instantaneously as shown in FIG. 4 to a point A corresponding to the heat radiation rate of the surface on which the electric resistor 1 is provided. Then, the power consumption is saturated at a point B after elapse of a considerably long time if there is no shielding member 5. Meanwhile, the temperature distribution is changed from that shown by the broken line to that shown by one-dot-and-dash line. In contrast to the above, in the embodiment of the invention shown in FIG. 1, the temperature distribution shown by the full line in FIG. 3 is kept unchanged because the flow velocity of the fluid on the surface having the electric resistor 1 is changed solely while the flow velocity of fluid on the other portions is kept substantially zero. In consequence, the increase of the electric power consumption is stopped at the point A shown in FIG. 4, and no change of power consumption takes place in the region between the points A and C. Thus, the change of the electric power consumption is completely related to the change in the rate of heat transfer by convection which is attributable to the change in the flow velocity. It is, therefore, possible to exactly determine the flow velocity from the power consumption. At the same time, the response characteristics are also improved as will be seen from FIG. 4. The response characteristics are improved equally in both cases where the flow velocity is increased and decreased in a stepped manner from a constant level.

Figure 5:
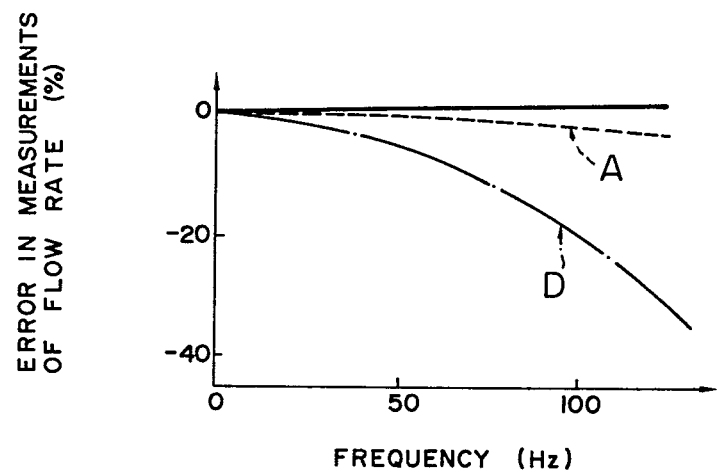
FIG. 5 is a graph showing the flow rate error in relation to the frequency of fluctuation of the flow of fluid in a hot-wire type flow velocity meter of the invention and in the hot-wire type flow velocity meter of the prior art.

As will be seen from FIG. 5, a flow rate error is inevitably increased as shown by a curve D when the frequency of fluctuation of flow rate is increased in the conventional flow velocity meter having no shielding member 5. In contrast, the flow velocity meter of the invention showed a remarkable reduction in the above-mentioned error at the high frequency range of fluctuation as will be understood from a curve A. This means that the flow velocity meter of the invention is suitable for use in the measurement of flow velocity of fluid which fluctuates at a high frequency as in the case of compressors, internal combustion engines and so forth. Therefore, according to the invention, it is possible to increase the supporting strength by increasing the cross-sectional area of the supporting member 3 without being accompanied by the reduction in the precision of the measurement. In consequence, the mechanical strength and the durability of the hot-wire types flow velocity meter can be improved remarkably while eliminating substantial error of measurement.

Figure 6:
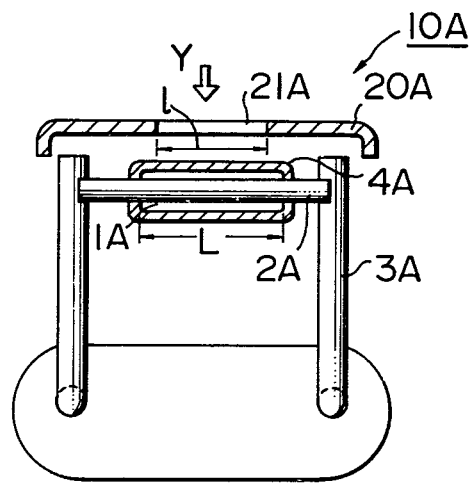
Figure 7:
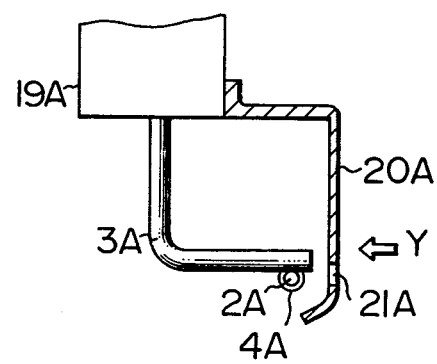

FIGS. 6 and 7 show a hot-wire type flow velocity meter 10A in accordance with a second embodiment of the invention. This flow velocity meter 10A is composed of an electric resistor 1A, a rod-shaped support 2A made of a ceramic material and supporting the electric resistor 1A, a coating member 4A coating the electric resistor 1A, supporting members 3A supporting the support 2A, a stationary member 19A supporting the supporting members 3A and an orifice plate 20A disposed at the upstream side of the support 2A. The fluid flows in the direction indicated by an arrow Y and the flow component which has passed through the orifice 21A of the orifice plate 20A impinges upon only the surface carrying the electric resistor 1A. Therefore, the temperature distribution along the length of the support 2A is never changed by the flow velocity so that an effect equivalent to that produced by the embodiment shown in FIG. 1 is achieved by this second embodiment. It has been confirmed also that the best result is obtained when the distance between the outlet of the orifice 21A and the surface of the support 2A is selected to be not greater than 10 times as large as the diameter of the orifice 21A. It is also preferred that the length 1 of the orifice 21 is selected to range between 0.2 and 2 times as large as the length L of the electric resistor 1A, i.e. between 0.2L and 2L, for otherwise the temperature distribution is varied to deteriorate the above-described advantage.

Figure 8:
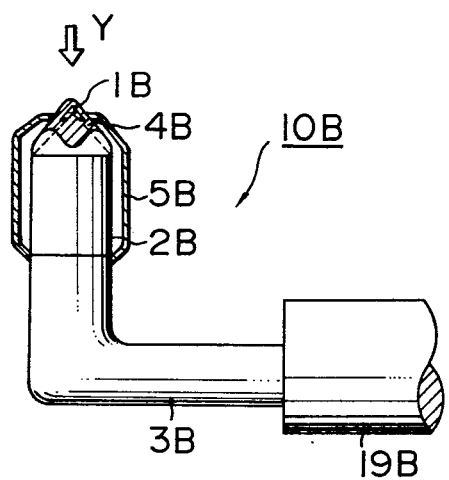

FIG. 8 shows a hot-wire type flow velocity meter in accordance with a third embodiment of the invention. This flow velocity meter is constituted by an electric resistor 1B, support 2B having a conical end, coating member 4B, supporting member 3B supporting the support 2B, a second supporting member 19B supporting the supporting member 3B and a shielding member 5B fixed to the support 2B. When the flow velocity meter 10B is situated such that end of the support 2B is directed against the flow of the fluid, the shielding member 5B serves to permit the flow of fluid impinge solely upon the electric resistor 1B.

Figure 9:
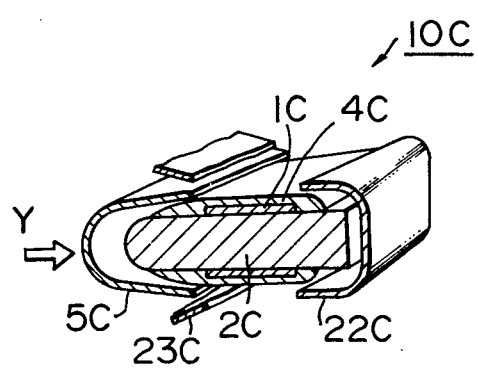

FIG. 9 shows a hot-wire type flow velocity meter 10C in accordance with a fourth embodiment of the invention.

In this flow velocity meter, the electric resistor 1C is attached to the side surface of a support 2C and a shielding member 5C is disposed at the upstream side of the support 2C in such a manner as to expose the electric resistor 1C solely. A second shielding member 22C is disposed downstream from the support 2C to prevent the fluid from impinging upon the downstream side end of the support 2C. A guide plate 23C may be provided to guide the fluid flowing along the upper surface of the shielding member 5C towards the electric resistor 1C so that the fluid may impinge upon the surface of the electric resistor 1C.

FIG. 10 shows a hot-wire type flow velocity member 10D in accordance with a fifth embodiment of the invention. This flow velocity meter is composed of a sensor cylinder 24D attached to a fluid passage 23D, a flow settling grid 25D attached to the sensor cylinder 24D, electric resistor 1D, supporting members 3D fixed to the sensor cylinder and serving also as leads for the electric resistor 1D, a cylindrical member 27D disposed at the upstream side of the electric resistor and having a neutral axis parallel to the direction of flow of the fluid, and a shielding member 26D fixed to the inner wall surface of the sensor cylinder in such a manner as to shield the supporting members 3D. The fluid flowing through the flow passage 23D is made to pass through the flow settling grid 25D to exhibit a uniform flow velocity distribution. The fluid flowing through the cylindrical member 27D impinges solely upon the surface of the electric resistor 1D, while the fluid flowing along outer side of the guide sleeve 27D is prevented by the shielding member 26D from contacting the supporting member 3D and deflected to the downstream side. In consequence, the temperature distribution on the support 2D and the supporting member 3D is never changed by the flow velocity of the fluid, so that the response characteristics of the flow velocity meter is improved advantageously.

FIG. 11 shows a cylindrical member 27D' and a shielding member 26D' which are modifications of those 27D and 26D shown in FIG. 10.

FIG. 12 shows a hot-wire type flow velocity meter 10E in accordance with a sixth embodiment of the invention. This flow velocity meter 10E has a sensor cylinder 27E provided with a by-pass passage 28E. A support 2E, supporting members 3E, a temperature compensation resistor 6E and an orifice plate 20E are disposed in the by-pass passage 28E. The support 2E carries an electric resistor (not shown) and is fixed to the wall defining the by-pass passage 28E through the supporting members 3E. The orifice plate 20E has an orifice 29E which permit the fluid to impinge solely upon the surface of the electric resistor. A part of the fluid flowing through the sensor cylinder 27E shuts to the by-pass passage 28E and impinges upon the electric resistor through the orifice 29E. According to this arrangement, the breadthwise temperature distribution is never changed by the change in the flow velocity of the fluid, so that the error of measurement due to the change in the flow velocity is remarkably suppressed. The following relationship exists in the electric circuit shown in FIG. 2.

$$RI^2 = (A + B\sqrt{v})(Tw - Ta) + q \tag{1}$$

where,
R: resistance of electric resistor,
I: current in electric resistor,
A, B: constants,
Tw: temperature of support surface,
Ta: air temperature,
q: heat relieved to supporting members.

In the electric circuit shown in FIG. 2, the temperature of the electric resistor is controlled such that a term $(Tw - Ta)/R$ derived from equation (1) takes a constant value. Supposing here that the temperature of the end portion of the supporting member is equal to the temperature of air Ta, the following equation (2) is derived.

$$q \propto (Tw - Ta) \tag{2}$$

Thus, the electric current I is maintained constant regardless of the change in the temperatures Tw and Ta. However, if the temperature Ts of the sensor cylinder 27E differs from the air temperature Ta, the heat relief q is changed by the temperature Ts so that the current I is changed to cause an error in the measurement. In order to avoid this problem, it is suggested to select the length of the supporting member to be mm or greater and the diameter of the same to be about 0.2 mm, i.e. to select the length/diameter ratio to be 10 times of greater. Alternatively, the temperature compensation resistor 6E is disposed in the close proximity of the support 2E as shown in FIG. 12.

Represent the temperature of the end portion of the supporting member 3E by Ts, the following equation (3) is derived.

$$RI^2 = (A + B\sqrt{u})(Tw - Ta) + k(Tw - Ts) \tag{3}$$

where, k represents a constant.

$$Rci^2 = (A + B\sqrt{u})(Tc - Ta) + k(Tc - Ts) \tag{4}$$

The following equation (5) is derived from the equations (3) and (4) above.

$$RI^2 - Rci^2 = (A + B\sqrt{u})(Tw - Tc) + k(Tw - Tc) \tag{5}$$

It will be seen that the unfavourable effect by the temperature Ts can be avoided by adopting the same supporting method.

Figure 13:
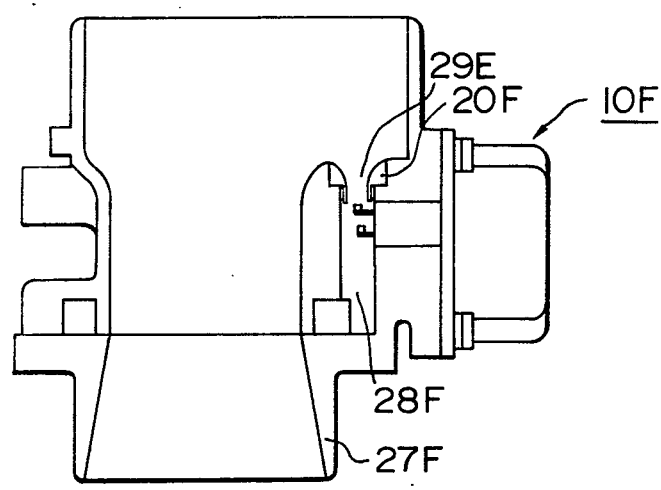
Figure 14:
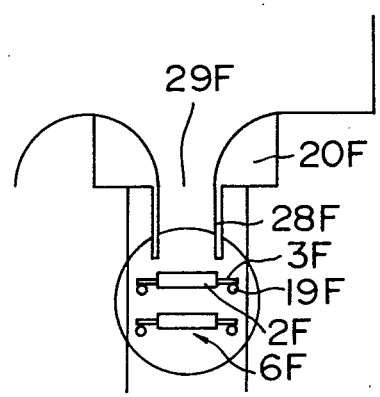

FIGS. 13 and 14 show a hot-wire type flow velocity meter 10F in accordance with a seventh embodiment of the invention. This flow velocity meter has a sensor cylinder 27F provided with a by-pass passage 28F. The by-pass passage accomodates a support 2F, supporting members 3F, temperature compensation resistor 6F and an orifice member 20F. The temperature compensation resistor 6F includes members similar to the support 2F and the supporting members 3F. The orifice member 20F has a curved surface enclosing an orifice 29F and a skirt 28F.

Figure 15:
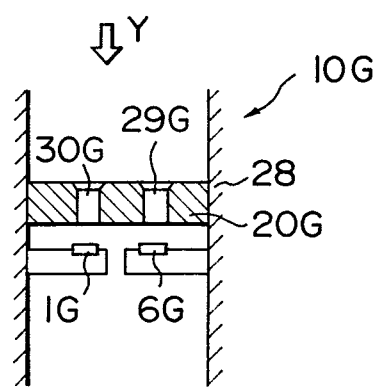

FIG. 15 shows a hot-wire type flow velocity meter 10G in accordance with an eighth embodiment of the invention. In this flow velocity meter, the electric resistor 1G and the temperature compensation resistor 6 are same with each other and are disposed downstream from the orifice plate 20G which has two orifices 29G and 30G to permit the fluid impinge upon only the electric resistor 1G and the temperature compensation resistor 6G.

Figure 16:
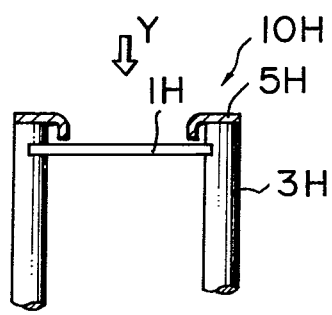
Figure 17:
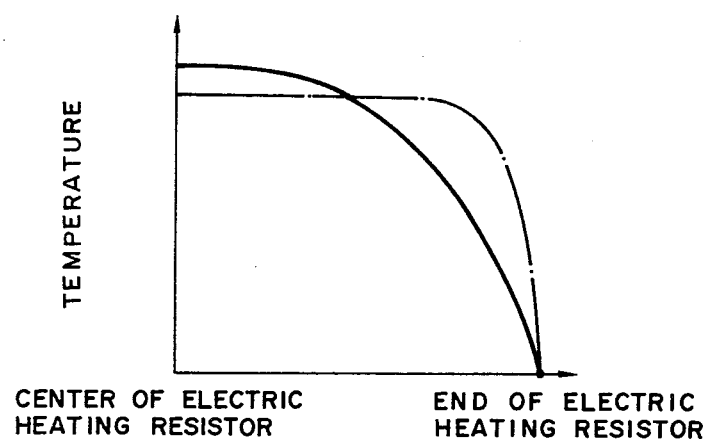
FIG. 17 is an illustration of the change in the temperature analysis of the electric resistor in relation to the change in the flow velocity.
Figure 18:
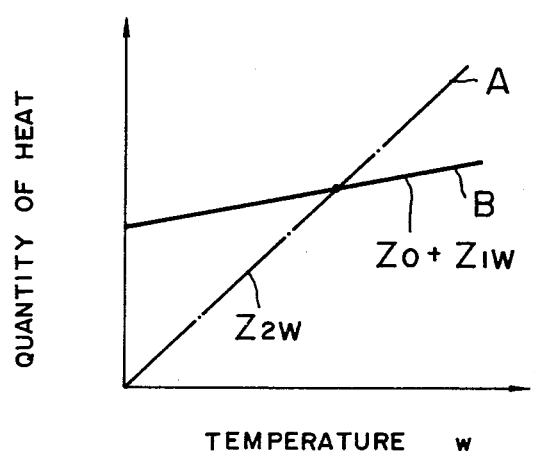
FIG. 18 shows how the heat generating rate and the heat radiation rate are changed in relation to the temperature of the electric resistor.

FIG. 16 shows a hot-wire type flow velocity meter 10H in accordance with a ninth embodiment of the invention having an electric resistor 1H made of a platinum wire, tungsten wire or the like material and having a diameter of 5 to 150 μm, supporting members 3H having large diameters and directly connected to the electric resistor 1 and a shielding member 5H covering the connections between the electric resistor 1H and the supporting members 3H. In the event that the supporting members 3H have a diameter considerably large for the diameter of the electric resistor 1, the temperature of the end portion of the electric resistor 1H is substantially equal to the temperature of the supporting member 3H, so that a temperature distribution as shown by full line in FIG. 17 is obtained along the length of the electric resistor 1H. In this case, the rate of heat radiation from every portions of the electric resistor 1H varies depending on the temperature. The rate of heat generation and the rate of heat radiation are varied in relation to the temperature in manners shown by curves A and B in FIG. 18. Supposing here that there is no shielding member 5H, the heat is relieved at a considerably large rate from the ends of the electric resistors to the supporting members 3H, so that the heat generating rate is greater than the heat radiation rate even though the temperature is low as shown in FIG. 17.

This relationship is expressed by the following equation (6).

$$k \frac{d^2 W}{dX^2} + Z_0 + Z_1 W - Z_2 \cdot W = 0 \tag{6}$$

where,
k: heat conductivity of electric resistor 1
$Z_0$, $Z_1$, $Z_2$: constants
w: temperature of electric resistor The constant $Z_2$ (coefficient of heat transfer from electric resistor to air) is generally increased as the air flow velocity is increased, so that the temperature distribution along the length of the electric resistor 1H becomes more free from the influence of the ends as will be understood from one-dot-and-dash line in FIG. 17. This change in the temperature distribution along the electric resistor 1H, attributable to the change in the flow velocity, causes an error in the measurement as stated before.

This problem, however, is effectively overcome by the present invention thanks to the provision of the shielding member 5H which covers the ends of the electric resistor 1H in the direction Y of flow of the fluid in such a manner as to keep the state of the ends of the electric resistor 1H unchanged regardless of a change in the flow velocity. Thus, the measurement error attributable to the change in the temperature distribution is avoided by this embodiment of the invention.

It is thus possible to eliminate the error in measurement by covering the ends of the heat generating member, in the case where the electric resistor 1H is directly attached to the supporting members 3H of the same temperature as the fluid, as well as in the case where the electric resistor is attached to a ceramic bar or the like and this heat generating body is attached to the supporting member of the same temperature as the fluid.

Figure 19:
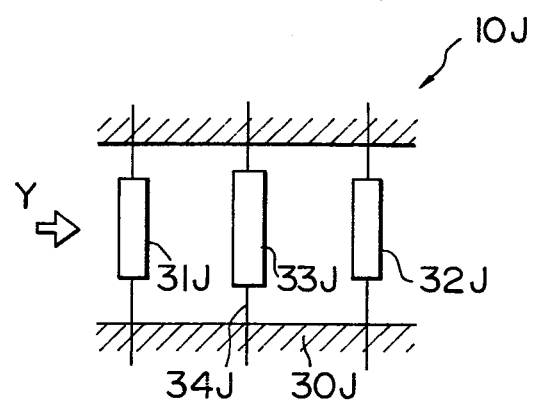
FIG. 19 is a side elevational view of an ordinary Thomas meter.

FIG. 19 shows a conventional hot-wire type flow velocity meter 10J constituted by an electric generator 33J and temperature detectors 31J and 32J which are disposed at the upstream side and downstream side of the electric heat generator 33J, respectively. The following relationship exists when the rate of heat generation by the heat generator 33 is varied to maintain a constant temperature difference T.

$$RI^2 = \Delta T \cdot C \cdot Ga \tag{7}$$

where,
C: specific heat
Ga: flow rate

In the equation (7) above, the Joule heat $RI^2$ is changed in proportion to the flow rate Ga.

Figure 20:
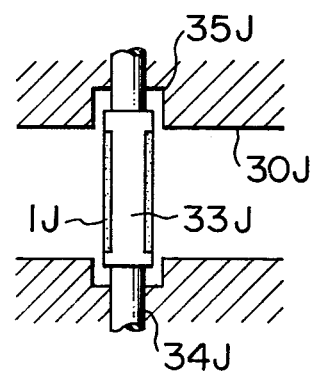
FIG. 20 is a side elevational view of a portion of a tenth embodiment of the invention in which the present invention is applied to a Thomas meter.

Then, as the air flow rate is increased, a temperature distribution is formed along the length of the electric heat generator 33J, so that the rate of heat transfer to the inner wall of the fluid passage 30J through the supporting members 34J is changed depending on the flow velocity to incur an error in the measurement. In the tenth embodiment of the invention, a recess 35J is formed in the inner wall surface of the fluid passage 30J as shown in FIG. 20, so that the other portions of the electric heat generator 33J than the portion having the electric resistor 1J are encased to avoid any change in the temperature distribution attributable to the change in the flow velocity. It is possible to use a suitable shielding member or an orifice in place of the recess. Namely, it is possible to adopt any construction provided that it permits the forced convection depending on the flow velocity only on the surface having the electric resistor, while other portions are substantially insulated thermally.

Figure 21:
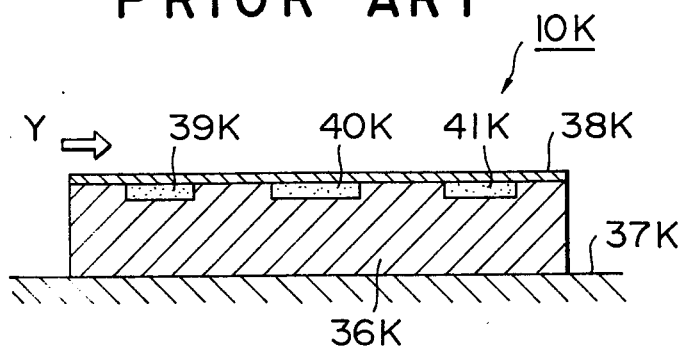
FIG. 21 is a side elevational view of an ordinary flow velocity meter.
Figure 22:
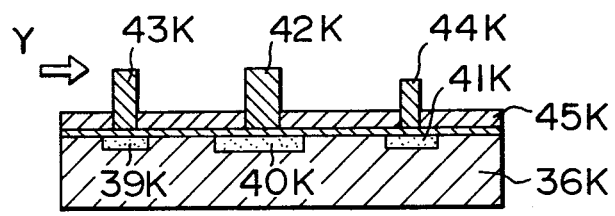
FIG. 22 is a side elevational view of an eleventh embodiment of the invention applied to the flow velocity meter as shown in FIG. 21.

FIG. 21 shows a known hot-wire type flow velocity meter 10K in which resistors 39K, 40K, 41K are formed on a substrate 36K of silicon or the like, and are covered by a protective film 38K and fixed to a supporting member 37K. In this flow velocity meter 10K, the resistor 40K serves as a heat generating body so that a temperature distribution is formed on the substrate 36K to cause a change in the temperature distribution depending on the velocity of the fluid flowing along the surface of the protective film 38K. FIG. 22 shows an eleventh embodiment of the invention in which the substrate 36K is shielded by a shielding member 45K to prevent any change in the temperature distribution attributable to the change in the flow velocity. The heat generated by the resistor 40K is transferred to the fluid through the heat transfer member 42K. The heat transfer member 42K is made to have a cross-sectional area substantially equal to that of the resistor 40K so that the change in the heat generated by the resistor 40K is wholly transferred to the fluid.

Figure 23:
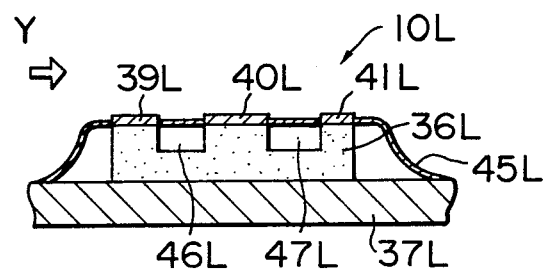
FIG. 23 is a side elevational view of a flow velocity meter in accordance with a twelfth embodiment of the invention.

FIG. 23 shows a hot-wire type flow velocity meter in accordance with a twelfth embodiment of the invention. In this embodiment, the portions of a substrate 36L other than the portions where the resistors 39L, 40L, 41L are formed are recessed as a 46L, 47L, and the portions other than the resistors 39L, 40L, 41L are covered by a shielding member 45L so that only the resistors 39L, 40L and 41L are subjected to the flow of fluid.

As has been described, the invention provides a hot-wire type flow velocity meter in which only the surface having the electric resistor is held under the condition of forced convection. In consequence, the unfavourable change in the heat transfer through the supporting member supporting the electric resistor, attributable to the change in the flow velocity of the fluid, is avoided advantageously to eliminate error of measurement.

What is claimed is:

1. In a hot-wire type flow velocity meter having an electric resistor for producing heat and a supporting member supporting said electric resistor, said electric resistor and said supporting member being placed in a flowing fluid and the flow velocity of said fluid being measured by sensing the change in the rate of heat transfer from said electric resistor to said fluid, an improvement which comprises shielding means for shielding said supporting member so as to prevent any change of rate of heat transfer from said supporting member to said fluid around said supporting member, and a support to the surface of which said electric resistor is attached and a coating member on the surface of said electric resistor, said support being supported by said supporting member, said shielding means comprising a shielding member attached to said supporting member and being disposed so as to shield said supporting member in such a manner as to expose only said electric resistor to the flow of fluid, wherein said shielding member is provided with a vent hole and further including a guide plate attached to said shielding member so as to be coaxial with said supporting member on one side of said resistor and within said shielding member.

2. In a hot-wire type flow velocity meter having an electric resistor for producing heat and a supporting member supporting said electric resistor, said electric resistor and said supporting member being placed in a flowing fluid and the flow velocity of said fluid being measured by sensing the change in the rate of heat transfer from said electric resistor to said fluid, an improvement which comprises shielding means for shielding said supporting member so as to prevent any change of rate of heat transfer from said supporting member to said fluid around said supporting member, and a support having a surface to which said electric resistor is attached and a coating member on the surface of said electric resistor, said support being supported by said supporting member, wherein said shielding means is an orifice plate disposed at the upstream side of said electric resistor and provided with an orifice, said orifice being so sized as to permit said fluid to impinge only upon said electric resistor.

3. A hot-wire type flow velocity meter according to claim 2, characterized by further comprising sensor cylinder provided with a by-pass passage, and a temperature compensation resistor, said orifice plate, electric resistor and said temperature compensation resistor are arranged in the mentioned order from the upstream side to the downstream side in said by-pass passage.

4. In a hot-wire type flow velocity meter having an electric resistor for producing heat and a supporting member supporting said electric resistor, said electric resistor and said supporting member being placed in a flowing fluid and the flow velocity of said fluid being measured by sensing the change in the rate of heat transfer from said electric resistor to said fluid, an improvement which comprises shielding means for shielding said supporting member so as to prevent any change of rate of heat transfer from said supporting member to said fluid around said supporting member, and a support having a surface to which said electric resistor is attached and a coating member on the surface of said electric resistor, said support being supported by said supporting member, a sensor cylinder provided with a by-pass passage, and a temperature compensation resistor, wherein said shielding means is an orifice member having a curved surface and a skirt, said orifice member having an opening sized to permit the flow of fluid to impinge only upon said electric resistor, said orifice member, said electric resistor and said termperature compensation resistor are arranged in the mentioned order from the upstream side to the downstream side in said by-pass passage.

5. In a hot-wire type flow velocity meter having an electric resistor for producing heat and a supporting member supporting said electric resistor, said electric resistor and said supporting member being placed in a flowing fluid and the flow velocity of said fluid being measured by sensing the change in the rate of heat transfer from said electric resistor to said fluid, an improvement which comprises shielding means for shielding said supporting member so as to prevent any change of rate of heat transfer from said supporting member to said fluid around said supporting member, and a support having a surface to which said electric resistor is attached and a coating member on the surface of said electric resistor, said support being supported by said supporting member, a sensor cylinder and a flow settling grid, said shielding means including a cylindrical member and a shielding body integral therewith, said flow settling grid, shielding means and said electric resistor being arranged in the mentioned order from the upstream side to the downstream side in said sensor cylinder.

6. In a hot-wire type flow velocity meter having an electric resistor for producing heat and a supporting member supporting said electric resistor, said electric resistor and said supporting member being placed in a flowing fluid and the flow velocity of said fluid being measured by sensing the change in the rate of heat transfer from said electric resistor to said fluid, an improvement which comprises shielding means for shielding said supporting member so as to prevent any change of rate of heat transfer from said supporting member to said fluid around said supporting member, and a support having a surface to which said electric resistor is attached and a coating member on the surface of said electric resistor, said support being supported by said supporting member, a by-pass passage, an orifice plate serving as a shielding means and a temperature compensation resistor, said orifice plate having a first orifice and a second orifice and disposed in said by-pass passage to take position upstream from said electric resistor and said temperature compensation resistor, said first orifice being aligned with said electric resistor as viewed in the direction of flow of said fluid, said second orifice being aligned with said temperature compensation resistor as viewed in the direction of flow of said fluid.

7. In a hot-wire type flow velocity meter having an electric resistor for producing heat and a supporting member supporting said electric resistor, said electric resistor and said supporting member being placed in a flowing fluid and the flow velocity of said fluid being measured by sensing the change in the rate of heat transfer from said electric resistor to said fluid, an improvement which comprises shielding means for shielding said supporting member so as to prevent any change of rate of heat transfer from said supporting member to said fluid around said supporting member, and a support having a surface to which said electric resistor is attached and a coating member on the surface of said electric resistor, said support being supported by supporting member, a pair of guide plates, said shielding means having a pair of shells having a curved cross-section, said shells being disposed at the upstream side and downstream side of said electric resistor such that said fluid flows only along the side surface of said electric resistor but does not impinge upon said supporting member.

8. In a hot-wire type flow velocity meter having an electric resistor for producing heat and a supporting member supporting said electric resistor, said electric resistor and said supporting member being placed in a flowing fluid and the flow velocity of said fluid being measured by sensing the change in the rate of heat transfer from said electric resistor to said fluid, an improvement which comprises shielding means for shielding said supporting member so as to prevent any change of rate of heat transfer from said supporting member to said fluid around said supporting member, and a support having a surface to which said electric resistor is attached and a coating member on the surface of said electric resistor, said support being supported by said supporting member, a pair of resistors disposed at both sides of said electric resistor and secured to the surface of said supporting member, said resistors being coated by a coating material, and three heat transfer members respectively extending from said pair of resistors and said electric resistor on the opposite side of said coating material therefrom, said shielding member including a shielding member placed on the surface portions of said coating material not covered by said heat transfer members.

9. In a hot-wire type flow velocity meter having an electric resistor for producing heat and a supporting member supporting said electric resistor, said electric resistor and said supporting member being placed in a flowing fluid and the flow velocity of said fluid being measured by sensing the change in the rate of heat transfer from said electric resistor to said fluid, an improvement which comprises shielding means for shielding said supporting member so as to prevent any change of rate of heat transfer from said supporting member to said fluid around said supporting member, a silicon substrate to the surface of which said electric resistor is attached, and a pair of resistors secured to the surface of said silicon substrate with said electric resistor sandwiched therebetween but spaced from said electric resistor, the surface of said silicon substrate being recessed at its portions between said electric resistor and said pair of resistors, said silicon substrate being attached to said supporting member, said shielding means being adapted to prevent said fluid from impinging upon said supporting member and said recesses in said substrate.

* * * * *